(12) United States Patent
Kleinsasser

(10) Patent No.: US 6,244,221 B1
(45) Date of Patent: Jun. 12, 2001

(54) GATE AND GATE POST ASSEMBLY

(75) Inventor: Jonathan Kleinsasser, St. Agathe (CA)

(73) Assignee: Crystal Spring Colony Farms Ltd., Ste. Agathe (CA)

( * ) Notice: Subject to any disclaimer, the term of this patent is extended or adjusted under 35 U.S.C. 154(b) by 0 days.

(21) Appl. No.: 09/433,928

(22) Filed: Nov. 4, 1999

(51) Int. Cl.$^7$ ....................................................... A01K 1/00
(52) U.S. Cl. ............................................................. 119/524
(58) Field of Search ..................................... 119/502, 504, 119/510, 512, 513, 514, 519, 516, 522, 524

(56) References Cited

U.S. PATENT DOCUMENTS

| | | | |
|---|---|---|---|
| 1,581,029 | * | 4/1926 | Smith . |
| 1,928,819 | * | 10/1933 | Neller . |
| 2,731,744 | * | 1/1956 | Schnell . |
| 3,650,245 | * | 3/1972 | Karnes . |
| 4,262,883 | * | 4/1981 | Feeken . |

* cited by examiner

Primary Examiner—Thomas Price
(74) Attorney, Agent, or Firm—Adrian D. Battison

(57) ABSTRACT

A gate and gate post assembly is provided for use with animal containment pens. The assembly includes a pair of upright posts arranged to be supported spaced apart, each post having an upper support flange adjacent a top end and a lower support flange adjacent a bottom end. A gate is arranged to be supported on the posts in an upright orientation. The gate has a pair of upper mounting pins extending downward from respective sides of the gate adjacent a top end of the gate and a pair of lower mounting pins extending downward from respective sides of the gate adjacent a bottom end of the gate. The upper and lower mounting pins are arranged for slidably engaging into respective apertures in the upper and lower support flanges. A pair of latches, each in the form of a pendulum, are provided for pivotally mounting onto the respective sides of the gate. The latches each include an engaging portion which is arranged to engage the corresponding support flange in an equilibrium position for restricting upward deflection of the gate relative to the post. Deflection of the latch from the equilibrium position allows the gate to be deflected upward for opening the gate.

7 Claims, 2 Drawing Sheets

GATE AND GATE POST ASSEMBLY

FIELD OF THE INVENTION

This invention relates to a gate and gate post assembly and more particularly to locking assembly for use with the gate and gate post assembly.

BACKGROUND

It is common practice to make use of pens having numerous gates for the containment and handling of animals such as hogs and the like. The gates generally include a panel element which is pivotally mounted between a pair of posts with a locking device coupled thereto to prevent the gate from being opened when unattended such that the animals are prevented from escaping the pen. The present invention is concerned with certain improvements to a gate and gate post assembly for use with animal containment pens.

SUMMARY

According to the present invention there is provided a gate and gate post assembly comprising:

a pair of upright posts arranged to be supported spaced apart;

a gate coupled to at least one of the posts for pivotal movement from a closed position between the posts to an open position wherein a free side of the gate is spaced from a corresponding one of the posts; and a latch pivotally mounted on the free side of the gate;

the latch having a pendulum portion which is suspended in equilibrium along the side of the gate in a locked position and an engaging portion which extends laterally outward from the pendulum portion towards the corresponding post for pivotal movement with the pendulum portion between the locked position and an unlocked position wherein the pendulum portion is deflected from equilibrium;

the engaging portion being located in alignment with a stop on the corresponding post in the locked position for restricting the gate from being opened and being spaced from the stop in the unlocked position for permitting the gate to be opened.

The gates are secured in a locked position by a simple mechanism which is biased towards the locked position to ensure that an animal is not able to release the gate. The self locking feature of the latch due to the pendulum ensures that the gate is adequately secured while unattended for preventing the accidental release of an animal.

There may be provided a pin extending downward from the free side of the gate and a mounting aperture located in a support flange on the post arranged to slidably receive the pin therein wherein the engaging portion of the latch comprises a horizontal flange for engaging a bottom side of the support flange in the locked position such that upward deflection of the side of the gate relative to the post is restricted for restricting the gate from being opened.

The engaging portion of the latch preferably extends laterally outward to a free end located adjacent a bottom end of the pin.

There may be provided an upper support flange adjacent a top end and a lower support flange adjacent a bottom end of each post; and a pair of upper mounting pins extending downward from respective sides of the gate adjacent a top end of the gate and a pair of lower mounting pins extending downward from respective sides of the gate adjacent a bottom end of the gate, the upper and lower mounting pins being arranged for slidably engaging into respective apertures in the upper and lower support flanges for coupling the gate to the posts;

wherein a latch is associated with each side of the gate.

The apertures in the upper and lower support flanges preferably comprise elongate slots such that the gate is permitted to be pivotally deflected within a plane extending between the posts for releasing one side of the gate independently of the other side.

Each of the upper and lower support flanges preferably includes a first mounting aperture and a second mounting aperture, the first mounting apertures being arranged to receive the respective mounting pins, the second mounting apertures being arranged to support an adjacent gate having a similar configuration such that numerous gates can be connected in series.

BRIEF DESCRIPTION OF THE DRAWINGS

In the accompanying drawings, which illustrate an exemplary embodiment of the present invention.

DETAILED DESCRIPTION

Figure 1:
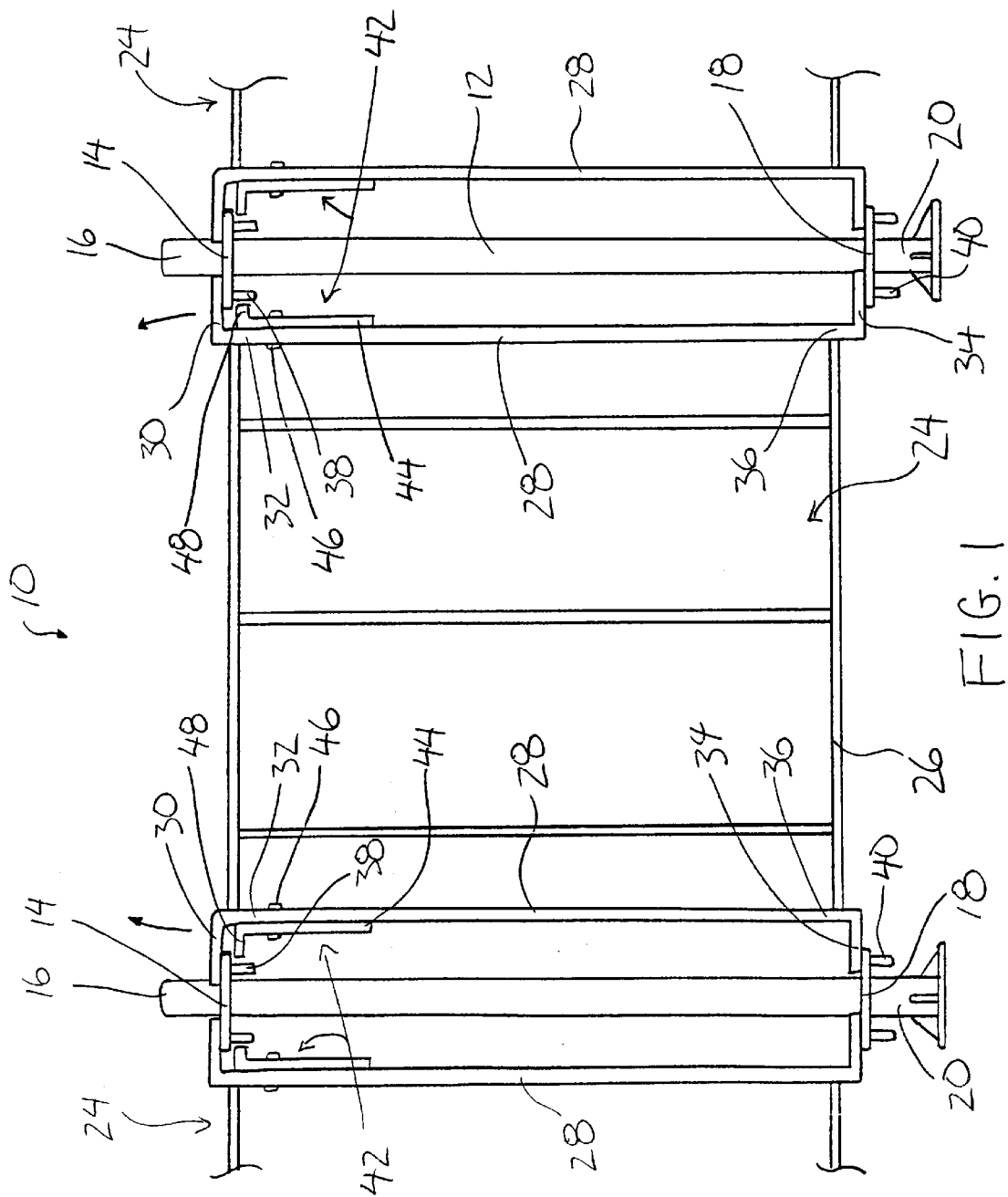
FIG. 1 is a front elevational view of a pair of gate posts according to the present invention with the gates mounted thereon.

Referring to the accompanying drawings, there is illustrated a gate and gate post assembly generally indicated by reference numeral 10. The assembly 10 is intended for use with conventional animal containment pens.

The assembly 10 includes a pair of posts 12 which are arranged to be supported on the ground spaced apart. The posts 12 define an opening therebetween for access into an animal containment pen.

Each post 12 includes an upper support flange 14 adjacent a top end 16 of the post and a lower support flange 18 adjacent a bottom end 20 of the post. The upper and lower support flanges 14 and 18 each comprise a plate member which is welded to the post to extend horizontally outward therefrom. A pair of mounting apertures 22 are located in each of the support flanges 14 and 18 in the form of elongate slots.

A gate 24 is provided and arranged to be supported in an upright orientation between the posts 12. The gate 24 includes a panel element 26 having a pair of sides 28 which are arranged to engage the respective posts 12. Each side 28 includes an upper mounting flange 30 adjacent a top end 32 and a lower mounting flange 34 adjacent a bottom end 36 of the gate. Each upper mounting flange 30 includes an upper mounting pin 38 which is arranged to extend downward from an outer end of the flange. Each lower mounting flange 34 includes a lower mounting pin 40 which extends downward from an outer end of the flange. The mounting pins 38 and 40 are arranged to be slidably engaged into the mounting apertures 22.

Each side 28 of the gate 24 includes a latch 42 which is pivotally mounted thereon. Each latch 42 includes a pendulum portion 44 which is arranged to be suspended from a pivotal mounting point 46 of the latch. An engaging portion 48 of the latch extends laterally outward from a top end of the pendulum portion 44 for engaging a corresponding upper support flange 14 of the corresponding post. A free end 50 of the engaging portion is arranged to be located in an equilibrium position of the pendulum adjacent a bottom end of the corresponding upper mounting pin 38. In this arrangement, upward deflection of the corresponding side of the gate is restricted by the engaging portion 48 which engages a bottom side of the upper support flange 14.

Figure 2:
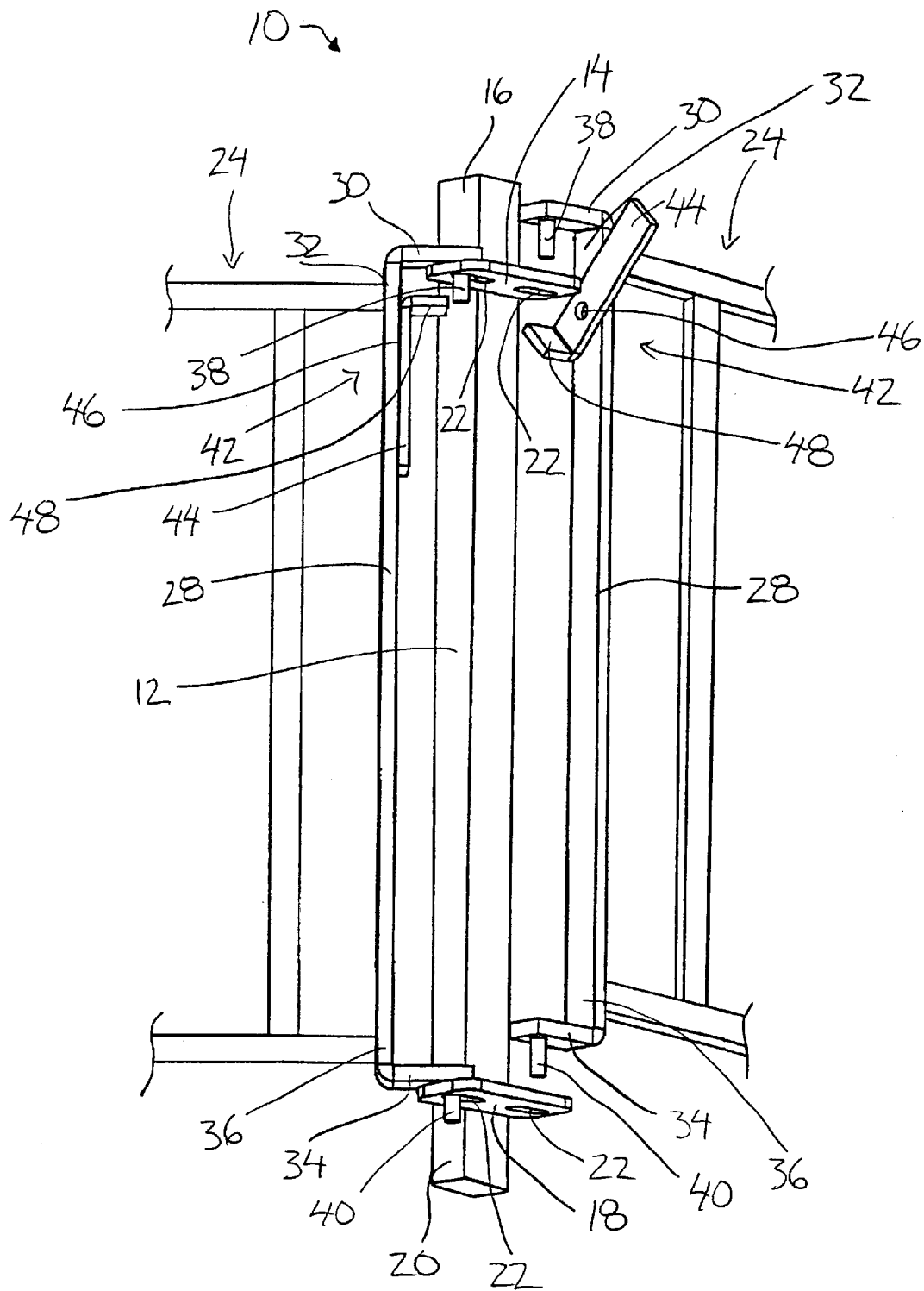
FIG. 2 is an isometric view of one of the posts showing a gate mounted thereon which has been unlocked and partially opened.

In use, a person deflects one of the latches 42 away from its equilibrium position from a locked position of the gate to an unlocked position of the gate as shown in FIG. 2. The corresponding side 28 of the gate 24 is thus free to be deflected upward relative to the corresponding post 12 until the upper and lower mounting pins 38 and 40 are free from the corresponding mounting apertures 22. The gate 24 may thus be swung open freely in either forward or rearward directions.

The mounting apertures 22 are in the form of elongate slots to permit some relative movement between the gate 24 and the posts 12. Orienting the slots to extend longitudinally towards the opposing posts permits the gate 24 to be rotated or pivotally deflected within a plane which extends between the posts in which the panel element 26 lies. This permits one side 28 of the gate 24 to be released independently of the opposing side.

Each of the upper and lower support flanges 14 and 18 include a pair of the mounting apertures 22 such that a first one of the mounting apertures is arranged to receive the corresponding mounting pins 38 and 40 of the gate 24 while a second one of the mounting apertures is arranged to receive the corresponding pins of an adjacent gate having a similar arrangement. In this arrangement, numerous gates 24 may be mounted in series between numerous posts 12 such that the gate and gate post assembly 10 is suitable for use with multiple pens containing animals therein.

While one embodiment of the present invention has been described in the foregoing, it is to be understood that other embodiments are possible within the scope of the invention. The invention is to be considered limited solely by the scope of the appended claims.

What is claimed is:

1. A gate and gate post assembly comprising:

first and second upright posts arranged to be supported on the around at spaced apart locations;

a gate being coupled at a first side to the first upright post for pivotal movement from a closed position spanning between the upright posts to an open position wherein a second side of the gate is spaced from the second upright post;

the gate including a pin extending downward from the second side of the gate;

the second post including a support flange mounted thereon having a mounting aperture located in the support flange arranged to slidably receive the pin therein in the closed position of the gate such that upward deflection of the second side of the gate is required to release the pin from the support flange to displace the gate into the open position; and a latch pivotally mounted on the second side of the gate having a pendulum portion and an engaging portion coupled to the pendulum portion, the latch being pivotal between a locked position in which the pendulum portion is suspended in equilibrium along the side of the gate and the engaging portion of the latch comprises a horizontal member extending laterally outward from the gate arranged to engage the second post in the locked position such that upward deflection of the second side of the gate relative to the second post is restricted for restricting the gate from being opened and an unlocked position in which the pendulum portion is pivotally deflected from equilibrium and the engaging portion is displaced from the locked position so as to be misaligned with the second post such that the second side of the gate is permitted to be raised upwardly and opened.

2. The assembly according to claim 1 wherein the engaging portion of the latch extends laterally outward to a free end located adjacent a bottom end of the pin in the locked position of the latch.

3. The assembly according to claim 1 wherein the engaging portion of the latch extends laterally outward below the support flange on the second post in the locked position for engaging the support flange to restrict upward deflection of the second side of the gate relative to the second post.

4. A gate and gate post assembly comprising:

a pair of upright gate posts arranged to be supported on the around at spaced apart locations;

each post including an upper support flange adjacent a top end and a lower support flange adjacent a bottom end of the post, each support flange having a mounting aperture therein;

a gate having a pair of sides arranged to be supported on the posts for pivotal movement of the gate between a closed position spanning between the posts and an open position in which the gate is supported on one of the posts and spaced from the other post;

a pair of upper mounting pins each extending downward from a respective one of the sides of the gate adjacent a top end of the gate and a pair of lower mounting pins each extending downward from a respective one of the sides of the gate adjacent a bottom end of the gate, the upper and lower mounting pins being arranged for slidably engaging into the mounting apertures in the respective upper and lower support flanges for coupling the gate to the posts such that upward deflection of one side of the gate is required to release the pins on said one side from the respective mounting apertures to displace the gate into the open position; and a pair of latches, each being associated with a respective one of the sides of the gate for engagement with a respective one of the posts, each latch having a pendulum portion and an engaging portion coupled to the pendulum portion, the latch being pivotal between a locked position in which the pendulum portion is suspended in equilibrium along the side of the gate and the engaging portion extends laterally outward in the closed position of the gate for engaging the respective post to restrict upward deflection of the respective side of the gate relative to the respective post and an unlocked position in which the pendulum portion is pivotally deflected from equilibrium and the engaging flange is displaced from the locked position so as to be misaligned with the respective post for permitting the respective side of the gate to be opened.

5. The assembly according to claim 4 wherein the mounting apertures in the respective upper and lower support flanges each comprise an elongate slot such that the gate is permitted to be pivotally deflected within a plane extending between the posts for releasing one side of the gate independently of the other side.

6. The assembly according to claim 4 wherein the upper and lower support flanges each include a first mounting aperture and a second mounting aperture, the first mounting apertures being arranged to receive the respective mounting pins of the gate therein, the second mounting apertures being arranged to receive the mounting pins of an adjacent gate having a similar configuration therein such that numerous gates can be connected in series using a plurality of upright posts.

7. The assembly according to claim 4 wherein the engaging portion of each latch extends laterally outward below the upper support flange on the respective post in the locked position for engaging the upper support flange to restrict upward deflection of the respective side of the gate in relation to the respective post.

* * * * *